(12) United States Patent
Bendali et al.

(10) Patent No.: US 12,239,984 B2
(45) Date of Patent: Mar. 4, 2025

(54) METHOD OF MANIPULATING DROPLETS IN A CHANNEL

(71) Applicant: INOREVIA, Paris (FR)

(72) Inventors: Amel Bendali, Courbevoie (FR); Julien Autebert, Le Kremlin Bicetre (FR)

(73) Assignee: INOREVIA, Paris (FR)

( * ) Notice: Subject to any disclaimer, the term of this patent is extended or adjusted under 35 U.S.C. 154(b) by 893 days.

(21) Appl. No.: 17/256,219

(22) PCT Filed: Jun. 24, 2019

(86) PCT No.: PCT/EP2019/066610
§ 371 (c)(1),
(2) Date: Dec. 27, 2020

(87) PCT Pub. No.: WO2020/002196
PCT Pub. Date: Jan. 2, 2020

(65) Prior Publication Data
US 2021/0229100 A1    Jul. 29, 2021

(30) Foreign Application Priority Data
Jun. 27, 2018    (EP) .................................... 18305818

(51) Int. Cl.
*B01L 3/00*    (2006.01)
(52) U.S. Cl.
CPC . *B01L 3/502784* (2013.01); *B01L 2200/0673* (2013.01); *B01L 2300/08* (2013.01); *B01L 2300/0838* (2013.01); *B01L 2300/161* (2013.01); *B01L 2400/088* (2013.01)

(58) Field of Classification Search
None
See application file for complete search history.

(56) References Cited

U.S. PATENT DOCUMENTS

| | | | |
|---|---|---|---|
| 5,268,147 A | 12/1993 | Zabetakis et al. | |
| 2005/0087122 A1* | 4/2005 | Ismagliov | B01F 25/4331 117/200 |
| 2005/0272079 A1* | 12/2005 | Burns | B01F 25/14 435/6.19 |
| 2010/0078077 A1 | 4/2010 | Ismagilov et al. | |
| 2011/0207621 A1* | 8/2011 | Montagu | B01L 3/502784 506/7 |

(Continued)

OTHER PUBLICATIONS

International Search Report and Written Opinion, PCT/EP2019/066610, mailed Jul. 24, 2019.

*Primary Examiner* — Samuel P Siefke
*Assistant Examiner* — Henry H Nguyen
(74) *Attorney, Agent, or Firm* — Alleman Hall & Tuttle LLP

(57) ABSTRACT

The invention relates to a method of manipulating droplets in a channel area, comprising: —providing a flow of carrier fluid in the channel area; —providing at least one droplet of a first fluid and at least one droplet of a second fluid within the carrier fluid, the first fluid and the second fluid being immiscible with the carrier fluid; —displacing the droplet of first fluid and the droplet of second fluid along the channel area, successively (a) by a flow of carrier fluid in a first direction and at a first flow rate; and (b) by a flow of carrier fluid in a second direction opposite to the first direction, and at a second flow rate different from the first flow rate.

18 Claims, 9 Drawing Sheets

(56) References Cited

U.S. PATENT DOCUMENTS

| | | | |
|---|---|---|---|
| 2015/0125947 A1* | 5/2015 | Korczyk | F16K 99/0017 |
| | | | 422/502 |
| 2015/0174576 A1* | 6/2015 | Van Vilet | B01L 3/502715 |
| | | | 506/40 |
| 2015/0273430 A1* | 10/2015 | Roelands | B01J 19/1831 |
| | | | 366/341 |
| 2016/0236194 A1* | 8/2016 | Autebert | B01L 3/0262 |
| 2016/0310947 A1 | 10/2016 | Walsh | |
| 2021/0055202 A1* | 2/2021 | Mutlu | G01N 15/1484 |

\* cited by examiner

METHOD OF MANIPULATING DROPLETS IN A CHANNEL

This application is a 35 U.S.C. § 371 US national stage entry of International Application number PCT/EP2019/066610, filed Jun. 24, 2019, and claims priority and is entitled to the following EP applications: EP18305818.9 filed Jun. 27, 2018 and EP18305818.9A filed Jun. 27, 2018. The contents of the aforementioned applications are incorporated by reference herein.

TECHNICAL FIELD

The present invention relates to a method for manipulating droplets in a channel, and notably for inducing or preventing merging between the droplets.

This method is applicable for performing assays such as reactions, amplifications, hybridizations and the like.

TECHNICAL BACKGROUND

Droplet systems, for instance consisting of water droplets in oil or a fluorinated oil, have received much attention in microfluidics as a tool to produce precise emulsions, to conduct reactions such as a polymerase chain reaction (PCR) within discrete microreactors, to perform measurement of fast kinetics, and to transport and handle sample aliquots without dispersion. Considerable efforts have thus been made in the last years to create and/or manipulate droplets or plugs in microfluidic systems.

In particular, it is desirable in many applications to induce the coalescence of two droplets or plugs, carried by a carrier fluid immiscible with said droplets or plugs, within a microfluidic channel, in order to put the contents of the two droplets or plugs into contact, e.g. to induce a reaction, or perform a labelling, or bring nutrients or drugs or reagents to living species contained in one of the droplets or plugs.

In EP 1637226, this effect was achieved by providing a pair of electrode arrangements along a channel, inducing an electric field collinear to the channel. Other methods were reviewed in e.g. Gu et al., Int. J. Mol. Sci., 12:2572-2597 (2011); doi:10.3390/ijms12042572.

Some methods, as described e.g. in Sivasamy et al., Microfluid Nanofluid 8:409-416 (2010); DOI 10.1007/s10404-009-0531-5, or in US 2006/0110831, use an expansion in a microfluidic channel in which the droplets are moving, or "vanish zone" to slow down a first droplet while the second is approaching, and induce coalescence.

In WO 2010/128157, coalescence is induced by implementing along the channel a zigzag shape, creating an acceleration or a change of direction of migration of the droplets at the points of change of shape of the channel.

WO 2014/151658, US 2016/129444, and Niu et al., Lab Chip, 8:1837-1841 (2008) disclose more complex microfluidic geometries, involving side channels, membranes, or channels with complex cross sections, to evacuate the carrier fluid between the droplets.

Hong et al., Biochip Journal, 3:203-207 (2009) discloses the merging of aqueous droplets within a microfluidic channel mediated by a difference in interfacial tension. The teaching of the document is strictly limited to rectangular microchannels. These require expensive clean room microfabrication.

All of the above methods thus require complex microfluidic devices, expensive microfabrication steps, or the need for extra components such as electrodes, field generators, and the like. There is thus a need for a simpler approach to control the merging of droplets in a fluidic system, that does not require such complex devices.

SUMMARY OF THE INVENTION

It is a first object of the invention to provide a method of manipulating droplets in a channel area, comprising:
  providing a flow of carrier fluid in the channel area;
  providing at least one droplet of a first fluid and at least one droplet of a second fluid within the carrier fluid, the first fluid and the second fluid being immiscible with the carrier fluid;
  displacing the droplet of first fluid and the droplet of second fluid along the channel area, successively
    (a) by a flow of carrier fluid in a first direction and at a first flow rate; and
    (b) by a flow of carrier fluid in a second direction opposite to the first direction, and at a second flow rate different from the first flow rate.

In some embodiments, the second flow rate is larger than the first flow rate, the ratio of the second flow rate to the first flow rate being from 1.05 to 100, preferably from 1.1 to 10, and more preferably from 1.2 to 5.

In some embodiments, the method comprises repeated sequences of steps (a) and (b).

In some embodiments, the droplet of first fluid and the droplet of second fluid merge during one step (b), or during one step (a); or the droplet and first fluid and the droplet of second fluid remain separated during all of step(s) (a) and (b) (e.g. a portion of carrier fluid remains between the two droplets).

In some embodiments, the method comprises, after the single or final step (b), a step of:
  (c) displacing the droplet of first fluid and the droplet of second fluid, or a droplet resulting from a merging of the droplet of first fluid with the droplet of second fluid, to make it or them exit the channel area, by a flow of carrier fluid, preferably in the first direction.

In some embodiments, the method comprises, after the single or final step (b), a step of:
  (d) displacing the droplet of first fluid and the droplet of second fluid, or a droplet resulting from a merging of the droplet of first fluid with the droplet of second fluid, to make it or them exit the channel area, by a flow of carrier fluid, preferably in the second direction.

In some embodiments, the channel area has an inlet and an outlet, the first direction being from the inlet to the outlet, and the droplet of first fluid and the droplet of second fluid enter the channel area by the inlet and reach the outlet of the channel area without merging.

In some embodiments, the first fluid has a first interfacial tension with the carrier fluid and the second fluid has a second interfacial tension with the carrier fluid, the first interfacial tension being lower than the second interfacial tension; or the second interfacial tension being lower than the first interfacial tension.

In some embodiments, the droplet of first fluid has a first length and the droplet of second fluid has a second length in the channel area, and the first length is larger than the second length; or the second length is larger than the first length.

In some embodiments, at least one of the first fluid and second fluid comprises a surface-active compound, the first fluid and second fluid preferably comprising different surface-active compounds or different amounts of same surface-active compounds.

In some embodiments, at least one of the first fluid and second fluid comprises water and a co-solvent, the first fluid and second fluid preferably comprising water and different co-solvents or different amounts of same co-solvents.

In some embodiments, the channel area has a substantially constant cross-section along the channel area.

In some embodiments, the channel area has a corner-free cross-section, preferably a circular or ellipsoidal cross-section, and/or the channel area is an area of a capillary tube.

In some embodiments, the maximal dimension of the cross-section of the channel area is at least 100 μm, preferably at least 300 μm, more preferably at least 500 μm; and/or at least one of the droplets has an aspect ratio of more than 2, preferably more than 3, more preferably more than 5, and most preferably more than 10.

The invention also relates to a method of performing a chemical, biological or biochemical assay, comprising merging droplets according to the abovementioned method, wherein the droplet of first fluid comprises at least a first reagent and the droplet of second fluid comprises at least a second reagent.

In some embodiments, this method is for performing an assay selected from chemical reactions, catalytic reactions, enzymatic reactions, nucleic acid amplifications, hybridizations or polymerizations, immunological reactions, screening of cells, growth of cells, analytical or bioanalytical processes, synthesis of molecules, macromolecules or particles, staining of particles, molecules, cells, organelles, viruses or living organisms, screening, high throughput screening, proteomics, genomics, transcriptomics, metabolomics and viability assays.

The present invention makes it possible to overcome the drawbacks of the prior art. In particular the invention provides a simple method for controlling (i.e. inducing or preventing) the merging of droplets in a fluidic system.

The invention relies on the realization that droplets of fluids may be displaced by a carrier fluid at different velocities relative to the flow of carrier fluid. This difference in relative velocity depends on a number of factors, including the flow rate of the carrier fluid, the respective lengths or aspect ratios of the droplets, and the interfacial tensions of the droplet fluids with the carrier fluid. By reversing the direction of flow of the carrier fluid and by modifying the flow rate of the carrier fluid, it is possible to achieve a fine control over the transport of droplets, and in particular to prevent or induce their merging, in a wide variety of conditions.

Besides, contrary to what is stated in Hong et al., Biochip journal, 3:203-207 (2009), it has unexpectedly been found that it is possible to displace droplets of fluids by a carrier fluid at different velocities relative to the flow of carrier fluid in a channel area having a substantially constant and corner-free section—whereas Hong et al. states that corners are required in order to obtain different relative velocities.

One advantage of some embodiments of the invention is that coalescence of droplets may occur at different locations along the channel area. In many instances in the prior art, coalescence must necessarily occur in a predefined region, such as a "vanish zone" or pairing module.

Another advantage of some embodiments of the invention, in particular relative to the teaching of Hong et al., is that a channel having a corner-free cross-section is generally easier and less costly to produce than a channel having corners, such as a channel having a rectangular cross-section. In particular, use may be made of tubes, which can be easily bent or rolled, and are thus much easier to implement than e.g. microfabricated chips. Finally, the absence of corners, together with the use of a "tight piston" configuration of droplets, allows a better control of flow.

DESCRIPTION OF EMBODIMENTS

Figure 1:
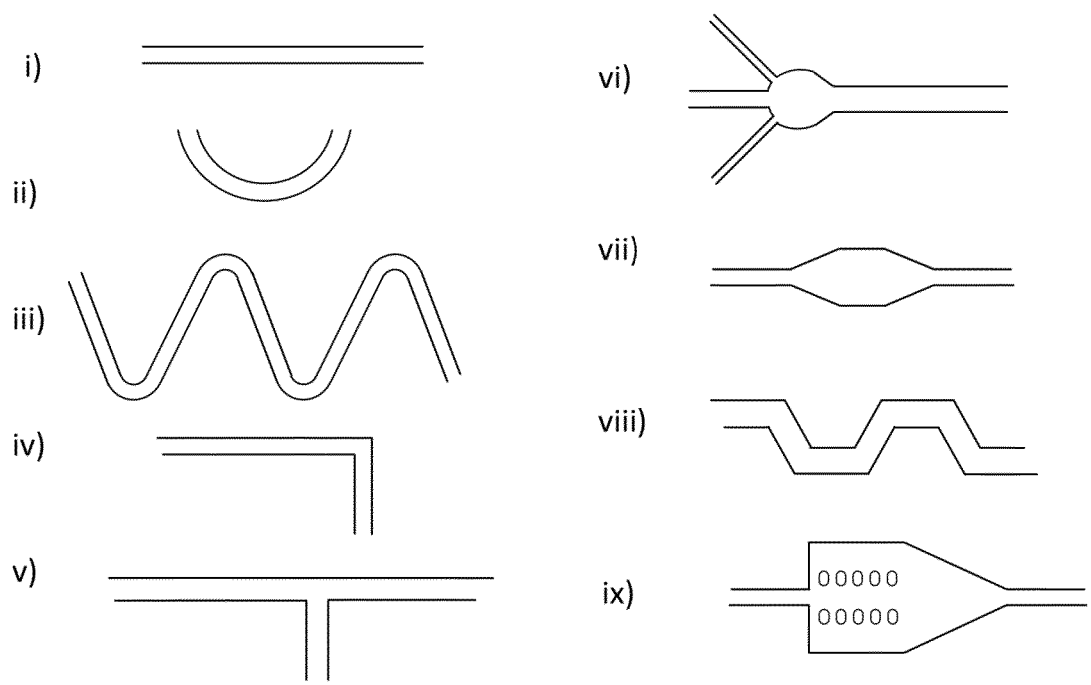
FIG. 1 schematically shows a number of shapes of channels which are or are not used in the invention.

The invention will now be described in more detail without limitation in the following description.

Device for Implementing the Method of the Invention

The invention is implemented in a device comprising at least one main channel. By "channel" is meant an elongated space within a tube, duct, pipe, or conduit, along which fluids can flow.

According to the invention, droplets are transported along an area of this main channel. This channel area has a length along a main direction (i.e. the average direction of flow within the channel area) and a cross-section (orthogonal to the main direction).

Preferably, said cross-section is substantially constant (along the length of the channel area).

Preferably, said cross-section is corner-free (at any position along the length).

The channel area is delimited by an inlet and an outlet. The inlet and outlet may e.g. correspond to a valve or to a junction with an additional channel or to a constriction or expansion zone.

By "substantially constant cross-section" is meant that the surface area of the cross-section of the channel area varies by less than 30%, preferably by less than 20%, more preferably by less than 10%, even more preferably by less than 5%, from the inlet to the outlet of the channel area. Most preferably, the surface area of the cross-section of the channel area is constant from the inlet to the outlet.

By "corner-free cross-section" is meant that the cross-section of the channel area does not have any corner (at any position along the length of the channel area, from the inlet to the outlet). A "corner" is herein defined as a portion of the perimeter of the cross-section where the radius of curvature of the perimeter is significantly smaller than the average radius of gyration of the perimeter, defined as $R_{av}=(S/\pi)^{1/2}$, where S is the cross-sectional surface area. More specifically, in preferred embodiments, the cross-section of the channel area does not have, at any position along the length of the channel area, a portion of the perimeter of the channel with a radius of curvature smaller than $R_{av}/2$ or smaller than $R_{av}/5$ or smaller than $R_{av}/10$.

In particular, the cross-section of the channel area is preferably not rectangular, nor square, nor trapezoidal, nor triangular or more generally not polygonal.

The cross-section of the channel area has preferably a curved shape on the entirety of its perimeter, at any position along the length of the channel area. More preferably, the ratio of the maximum radius of curvature of the perimeter of the cross section to the minimum radius of curvature of the perimeter of the cross section is less than 10, even more preferably less than 5, most preferably less than 2, at any position along the length of the channel area.

One advantage of the absence of corners is the ability to prevent unwanted leaks of carrier fluid in the channel.

Accordingly, in some preferred embodiments, the cross-section of the channel area is not rectangular, square, trapezoidal, triangular or more generally polygonal.

However, in some other embodiments, the cross-section of the channel area may be rectangular, square, trapezoidal, triangular or more generally polygonal.

In some other embodiments, the cross-section of the channel area does not comprise any flat wall.

In some embodiments, the cross-section of the channel area is preferably circular. Alternatively, it can be e.g. ellipsoidal. In some embodiments, the shape of the cross-section varies between the inlet and the outlet of the channel area. In other, preferred embodiments, the shape of the cross-section remains constant from the inlet to the outlet of the channel area.

The channel area may be straight or bent, along the direction of flow. If it is bent, it can be bent in one direction or in different successive directions. The channel area may comprise one or more straight portions alternating with one or more bent portions.

The channel area may comprise differently oriented straight portions directly connected together. But, in other preferred embodiments, the channel area does not comprise differently oriented straight portions directly connected together. Indeed, in general, if differently oriented straight portions (especially at an angle of 90° or close to 90°) are directly connected together, the cross-section of the channel is not substantially constant in the connection region.

A straight channel is illustrated as i) in FIG. 1. A bent channel is illustrated as ii) in FIG. 1. A channel comprising straight portions alternating with bent portions is illustrated as iii) in FIG. 1.

In iv) to ix) of FIG. 1, channel configurations are shown, which may be used in the invention, although they do not have a substantially constant cross-section along the length.

The main direction of the channel area may be comprised in a plane or may have a three-dimensional shape.

The main channel is preferably a capillary tube, more preferably a flexible capillary tube.

The main channel may be millimetric (a millichannel), or micrometric (a microchannel), or nanometric (a nanochannel). "Millimetric" means that at least one dimension of the cross-section is from 1 mm to 1 cm; "micrometric" means that at least one dimension of the cross-section is from 1 μm to 1 mm; "nanometric" means that at least one dimension of the cross-section is from 1 nm to 1 μm.

The maximum dimension of the cross-section of the main channel may for instance range from 100 nm to 10 μm, or from 10 to 100 μm, or from 100 to 200 μm, or from 200 to 350 μm, or from 350 to 600 μm, or from 600 μm to 2 mm, or from 2 to 10 mm. If the cross-section is circular, the above ranges apply to the diameter of the channel.

The device used in the invention and in particular the main channel of the device may be prepared for instance by microlithography, soft lithography, hot embossing, microcontact printing, direct laser writing, additive or subtractive 3D printing, micromachining, removing sacrificial wires or materials, injection molding or extrusion.

In other preferred embodiments, the main channel may be a tube, made for instance of silicone, Tygon®, polytetrafluoroethylene (PTFE), other fluoropolymers or perfluoropolymers, ceramic, metal or polyethetherketone (PEEK).

In preferred embodiments, the main channel is made of a material selected so that it is more wetting for the carrier fluid than for the droplet fluids, along the channel area. The surface of the main channel may be treated to achieve this property. The main channel preferably has, on part or all of the channel area, an interfacial tension with the carrier fluid which is smaller than the interfacial tension with the droplet fluids.

The device may also comprise additional channels connected to the main channel, in particular to supply the first fluid, the second fluid and the carrier fluid to the main channel. The device may also comprise a plurality of inlets and outlets, valves, as well as reservoirs for the various fluids used.

Droplets may be generated in the device by any means known in the art, such as pipetting, as described e.g. in WO 2008/032276, flow focusing, as described e.g. in US 2006/0163385, or a T junction, as described e.g. in Tice et al., Langmuir, 19:9127-9133 (2003).

Most preferably, no additional channel is connected to the channel within the channel area as defined above.

The device used in the invention advantageously comprises (or is connected to, generally by fluid conduits) detection means such as optical detection means (for example for detection by luminescence, fluorescence, phosphorescence, light absorption, diffraction, refractometry or plasmon resonance) or electrical detection means (for example for detection by impedance measurement, conductometry, electrochemistry or cyclic voltammetry), or acoustic detection means, for example sensors based on piezoelectric materials such as quartz microbalances or surface-wave resonators.

The devices may comprise or be connected to analysis apparatuses, connectors or chemical reactors; for example to a mass spectrometer, to a nucleic acid amplification device, to a "DNA chip" or "protein chip" often referred to as a "microarray", to a nucleic acid sequencer, to an electrophoresis device, to a filter, to a mixer or the like.

The device used in the invention advantageously comprises fluid-actuation means, capable of moving the carrier fluid, the first fluid, the second fluid, etc., in a controlled manner, along the channel area and e.g. from respective reservoirs and/or to any collection or detection instruments. These fluid-actuation means may comprise microfabricated pumps or external pumps, such as microfluidic control pumps, syringe pumps, peristaltic pumps, membrane pumps, piston pumps or rotary pumps.

The device of the invention may also comprise or be associated with a temperature regulation system, comprising a heating and/or cooling element and one or more temperature sensors.

The device of the invention may also be associated with, or may comprise, any data-processing, electronic or electrical controller, in order for example to control the temperature and functioning of the various components, to automate the operations and to record data.

Control of the Relative Velocity of Droplets in the Channel Area

According to the invention, a flow of carrier fluid is provided in the channel area, and at least one droplet (or plug) of a first fluid and at least one droplet (or plug) of a second fluid are provided in the carrier fluid in the channel area, and displaced along the channel area, in a given direction, by the carrier fluid.

Before they (optionally) merge or coalesce, the droplets are physically separated by the carrier fluid.

Coalescence or merging herein designates an operation or mechanism in which two or more droplets initially surrounded by an immiscible fluid merge together to yield one single droplet, or a smaller number of droplets.

By "displaced by the carrier fluid" is meant that the droplets move only due to the hydrodynamic flow of carrier fluid. The droplets do not move under the effect of another force, such as an electric force or a magnetic force, or at least do not move only under the effect of such other force. Accordingly, the channel area is preferably not subjected to any electric field or magnetic field.

In some embodiments, alternating droplets of the first fluid and of the second fluid are provided. In some embodiments, additional droplets of a third fluid, or fourth fluid, etc. are provided.

Each of the first, second, etc. fluid is immiscible with the carrier fluid.

Each droplet is surrounded by two respective portions of the carrier fluid.

The first, second, etc. fluids may be the same or different.

Preferably, the carrier fluid is a hydrophobic or low polarity liquid, and each of the first, second, etc. fluid is a hydrophilic or high polarity liquid.

Alternatively, in other embodiments, the carrier fluid is a hydrophilic or high polarity liquid, and each of the first, second, etc. fluid is a hydrophobic or low polarity liquid.

A preferred example of a hydrophobic or low polarity liquid is an oil. A preferred example of a hydrophilic or high polarity liquid is an aqueous solution.

The oil is preferably a fluorinated or perfluorinated oil. Examples of fluorinated oils that can be used in the invention are marketed as the FC series, such as Fluorinert FC40, FC42 and FC70. Other preferred options are marketed as Novec HFE-7500, HFE 7000, HFE7100 and others of this series.

The carrier fluid used in the invention may have a kinematic viscosity from e.g. 0.1 to 0.5 cSt, or from 0.5 to 1 cSt, or from 1 to 5 cSt, but also in some cases a higher kinematic viscosity, such as from 5 to 10 cSt, or from 10 to 100 cSt, or even from 100 to 1000 cSt.

The droplet fluids used in the invention may have a kinematic viscosity from e.g. 0.1 to 0.5 cSt, or from 0.5 to 1 cSt, or from 1 to 5 cSt, but also in some cases a higher kinematic viscosity, such as from 5 to 10 cSt, or from 10 to 100 cSt, or even from 100 to 1000 cSt.

In some preferred embodiments, the ratio of the kinematic viscosity of the droplet fluid to the kinematic viscosity of the carrier fluid is from 0.1 to 1, or from 1 to 5, or from 5 to 20.

Each of the first, second, etc. fluid and carrier fluid may optionally comprise surface-active compound(s).

The shape and volume of the droplets in the invention may vary widely depending on the implementation and specific application, e.g. from 1 to 10 µL, or from 10 to 100 µL, or from 100 µL to 1 nL, or from 1 to 10 nL, or from 10 to 100 nL, or from 100 to 500 nL, or from 500 nL to 5 µL, or from 5 to 100 µL. In particularly preferred embodiments the volume of the droplets is comprised between 10 nL and 10 µL.

In preferred embodiments, the droplets are highly confined in the channel area, which means that they are deformed by the channel, and that their cross-section is substantially identical to the cross-section of the channel, within the channel area.

In preferred embodiments, the droplets have a prolate shape, with a major axis along the main direction of the channel area.

The aspect ratio of the droplets is defined as $\ell = L/w$, where L is the length of the droplets (i.e. maximal dimension of the droplets along the main direction of the channel area) and w is the width of the droplets, which is deemed to be equal to the width of the channel area (i.e. the maximal dimension of the cross-section of the channel area). The aspect ratio is preferably larger than 2. In some preferred embodiments, the aspect ratio is from 2 to 3, or from 3 to 5, or from 5 to 10, or from 10 to 20, or from 20 to 100. Preferably, the aspect ratio of the droplets remains constant as they travel within the channel area.

The length L of the droplets may e.g. range from 1 to 10 µm, or from 10 to 100 µm, or from 100 µm to 1 mm, or even from 1 to 10 mm.

More specifically and surprisingly, the invention makes it possible to use droplets having a relatively large aspect ratio, combined with a relatively large volume. In the prior art, such as e.g. in Tice et al., Langmuir, 19:9127-9133 (2003), droplets with a large aspect ratio of more than 10 were used, but this was with small capillaries, having a rectangular cross-section and lateral dimensions smaller than 100 µm and. Conversely, droplet manipulation is also known with millifluidic devices, as described e.g. in Baraban, Lab Chip 11:4057 (2011), using tubing of a diameter of typically 0.5, but in this case the aspect ratio of droplets had to be kept relatively low, typically at 1.5, and always smaller than 3, and intercalating mineral oil was necessary to avoid "traffic jam" effects. The invention is not limited in this manner, because it can precisely control the relative velocity of droplets.

Thus, in some embodiments of the invention, the channel area has a maximal dimension in the cross-section larger than 100 µm and at least one of the droplets has an aspect ratio larger than 3, preferably larger than 5, more preferably larger than 10, most preferably larger than 20. In particular, the channel area may have a maximal dimension in the cross-section from 100 to 200 µm and at least one of the droplets has an aspect ratio larger than 3, preferably larger than 5, more preferably larger than 10, most preferably larger than 20. Or the channel area may have a maximal dimension in the cross-section from 200 to 500 µm and at least one of the droplets has an aspect ratio larger than 3, preferably larger than 5, more preferably larger than 10, and even in some embodiments larger than 20. Or the channel area may have a maximal dimension in the cross-section from 500 µm to 2 mm and at least one of the droplets has an aspect ratio larger than 3, preferably larger than 5, more preferably larger than 10, most preferably larger than 20.

The invention relies on the control of the relative velocity $\beta$ of the various droplets, defined as the ratio of the velocity V of the droplet to the velocity U of the carrier fluid, within the channel area.

The invention is made possible by the realization that the relative velocity of each droplet can be adjusted based on different parameters:
- the velocity U of the carrier fluid;
- the aspect ratio $\ell$ of the droplets (or the length L of the droplets, if all droplets have the same width w which is set by the cross-sectional shape of the channel area); and
- the interfacial tension $\gamma$ between each of the first, second, etc. fluid and the carrier fluid.

Adjusting all of these parameters, or adjusting one or some of these parameters while the other(s) of these parameters is or are fixed, makes it possible to promote the merging of droplets or on the contrary to prevent the merging of droplets.

The velocity U of the carrier fluid may be adjusted simply by setting the flow rate of carrier fluid to a desired value.

The flow rate of the carrier fluid may vary depending on the application, and in particular on the dimensions of the channel. In some preferred embodiments, a flow rate from 1 to 10 µL/min, or from 10 to 100 µL/min, or from 100 to 1000 µL/min can be used in any step of the method of the invention, preferably for channels having a maximal dimension (in the cross-section) from 100 to 500 µm. In some preferred embodiments, a flow rate from 0.1 to 1 µL/min, or from 1 to 10 µL/min, or from 10 to 100 µL/min can be used in any step of the method of the invention, preferably for channels having a maximal dimension (in the cross-section) from 20 to 200 µm. In some preferred embodiments, a flow rate from 0.01 to 0.1 µL/min, or from 0.1 to 1 µL/min, or from 1 to 100 µL/min can be used in any step of the method of the invention, preferably for channels having a maximal dimension (in the cross-section) from 1 to 50 µm. In some preferred embodiments, a flow rate from 10 to 100 µL/min, or from 100 to 1000 µL/min, or from 1 to 100 mL/min can be used in any step of the method of the invention, prefer-ably for channels having a maximal dimension (in the cross-section) from 500 µm to 5 mm, or up to 10 mm.

The above values apply both to method steps (a) and (b) which will be described in more detail below.

At any given velocity (or flow rate) of the carrier fluid, the droplets of first fluid and second fluid may have different aspect ratios and/or different interfacial tensions with the carrier fluid.

The aspect ratio $\ell$ of each droplet may be adjusted by setting the volume of the droplet to a desired value, when the droplet is generated.

More specifically, it has been found that when $\ell$ is below a threshold value Th, the relative velocity of droplets of a given fluid decreases when the aspect ratio of the droplets increases. Conversely, above Th, the relative velocity of droplets of a given fluid increases when the aspect ratio of the droplets increases.

Therefore, if the first fluid and second fluid are the same or have approximately the same interfacial tension with the carrier fluid, in order to promote coalescence, the droplet of first fluid should have a larger aspect ratio than the droplet of second fluid, below the threshold value Th; and the droplet of first fluid should have a smaller aspect ratio than the droplet of second fluid, above the threshold value Th.

Obviously, opposite rules for positioning can be applied to prevent coalescence.

In some preferred embodiments, the threshold Th is from 2 to 3, or from 3 to 5, or from 5 to 10.

The interfacial tension of each droplet fluid with the carrier fluid depends on temperature, and on the nature of the droplet fluid (or dispersed phase), the nature of the carrier fluid (or continuous phase) and the concentration and type of surface-active compounds optionally present in each fluid. It can thus be adjusted in particular (at a given temperature) by an appropriate selection of the materials used for and in each fluid.

The interfacial tension may be measured in mN/m. Different methods for measuring the interfacial tension are known in the art, such as pendant drop, static imaging of a drop on a flat surface, or others, reviewed e.g. in *Surface and interfacial tension measurement, theory and applications, surfactant science series*, Stanley Hartland ed., p. 368-419. Herein, the interfacial tension between two liquids may be conveniently measured by the pendant drop method. The interfacial tension between a liquid and a solid can be measured by imaging the contact angle between a static drop of the liquid and a flat surface of the material.

The absolute difference between the interfacial tension of the first fluid with the carrier fluid and the interfacial tension of the second fluid with the carrier fluid may e.g. range from 0 to 1 mN/m, or from 1 to 5 mN/m, or from 5 to 10 mN/m, or from 10 to 20 mN/m, or from 20 to 50 mN/m, or from 50 to 100 mN/m. Lower values of this absolute difference are preferred when coalescence is to be prevented, while higher values are preferred when coalescence is to be promoted.

In particular, the carrier fluid, which is preferably an oil, may contain one or more surface-active compounds, preferably oil-soluble surface-active compounds. Examples of such surface-active compounds include a perfluoropolyether moiety (e.g. known as Krytox) attached to a water-soluble polymer or oligomer, such as e.g. polyethylene glycol. Examples of these surface-active compounds are described in WO 2010/128157. Other examples of oil-soluble surface-active compounds useful in the invention are e.g. 1H, 1H, 2H, 2H-perfluoro-1-decanol, and other surface-active compounds described in EP 1637226.

Surface-active compounds in the carrier fluid may be used, depending on the application, at varying concentrations, such as from 0.001 to 0.01%, or from 0.01 to 0.1%, or from 0.1 to 0.5%, or from 0.5 to 5%, or even from 5 to 20% (by weight).

In some embodiments, it may be useful to refer to the critical micellar concentration (cmc) of the surface-active compound. This is the concentration of surface-active compound above which micelles form and additional surface-active compounds added to the fluid go to micelles. As known in the art, the cmc can e.g. be measured by measuring the interfacial tension at different surface-active compound concentrations. The cmc is the concentration at which the interfacial tension stops decreasing, or shows a change of slope towards a lower slope, when increasing the concentration of surface-active compound.

In some embodiments, the concentration of surface-active compound in the carrier fluid is approximately equal to the critical micellar concentration cmc. In some embodiments, the oil-soluble surface-active compound is used at a concentration in the carrier fluid from 0.1 to 1 times the cmc, or from 1 to 5 times the cmc, or from 5 to 10 times the cmc, or from 10 to 50 times the cmc.

Yet further oil-soluble molecules usable as surface-active compounds in the carrier fluid are perfluoropolyether compounds per se (e.g. known as Krytox), without additional treatment or grafting of hydrophilic moieties. Such molecules are preferably used at a concentration from 0.1 to 10%, more preferably from 0.3 to 3% (by weight).

Surface-active compounds which may in particular be used in one or more of the droplet fluids are compounds generally known as surfactants, or equivalently tension-active compounds, which are soluble in these droplet fluids, and more particularly water-soluble surfactants (if the droplet fluids are aqueous solutions). As non-limitative examples of such surfactants, reference may be made to polysorbate-type nonionic surfactants, formed by the ethoxylation of sorbitan before the addition of lauric acid (marketed as Tween 20, Tween 80 and other references of the Tween family), alkylaryl polyether alcohols (marketed as Triton X-100 and other references of the Triton family), block copolymers, notably diblock, triblock and multiblock copolymers, notably ethylene-propylene block copolymers (such as marketed under the name Pluronics) and phospholipids. Mixtures of the above surfactants may also be used.

However, the invention is also advantageous in relation with any type of compound that can be surface-active, i.e. modify the surface energy of a liquid, or its interfacial tension with another liquid, or with a solid. Typically, such surface-active compounds may be any compound know, in the art as "surfactants" or "tension-active molecules", but more generally molecules that have a polarity different from that of water, or any molecule comprising a combination of hydrophobic and hydrophilic parts, when said molecules are present in the fluid at a concentration sufficient to modify its interfacial energy or interfacial tension. Such molecules may be, for instance and non limitatively, organic molecules, especially organic molecules at least partly miscible with water, proteins, peptides, metabolites, organic ions, alcohols, ketones, natural products, polysaccharides, food dyes, food products.

Surfactants in the invention may be used, depending on the application, at varying concentrations in the droplet fluids, such as from 0.0001 to 0.001%, or 0.001 to 0.01%, or 0.01 to 0.1%, or 0.1 to 0.5%, or 0.5 to 5%, or even 5 to 20% (by weight).

In some embodiments, the concentration of a surfactant in a droplet fluid is below the cmc. In other embodiments, it is above the cmc. The surfactant concentration may be below 0.01 times the cmc, or from 0.01 to 0.1 times the cmc, or from 0.1 to 1 times the cmc, or from 1 to 2 times the cmc, or from 2 to 5 times the cmc, or from 5 to 10 times the cmc, or from 10 to 50 times the cmc.

The interfacial tension of a droplet fluid with the carrier fluid may also be adjusted by adding to the droplet fluid surface-active molecules that are not usually referenced as surfactants. By way of example, if the main component of a fluid is water (which is preferred for the droplet fluids in this invention), a number of water-soluble or partly water-soluble components, such as co-solvents, can be added to modify the polarity and thus the interfacial properties of the fluid. Such components include, as a non-limitative list of examples, alcohols such as ethanol, methanol, isopropanol, diols and polyols such as glycerol, acetone, and more generally organic solvents at least partly miscible with water, polymers such as polysaccharides, polypeptides and in particular proteins, as well as derivatives thereof. These components are able to change the interfacial tension between the droplet fluid and the carrier fluid.

In preferred embodiments, such components may be used at a concentration of from 0.0001 to 0.001%, or from 0.001 to 0.01%, or from 0.01 to 0.1%, or from 0.1 to 0.5%, or from 0.5 to 5%, or from 5 to 20%, or even from 20 to 80% (by weight).

In some embodiments, the main component of a droplet fluid may be an organic solvent, such as, by way of example, alcohols such as ethanol, methanol, and polyols, alkanes and dimethylsulfoxide.

Using an experimental setup as described for instance in Example 1, it is possible to prepare an abacus providing, for a given channel area, the relative velocity of a droplet relative to the carrier fluid, as a function of a number of factors, such as the nature of the carrier fluid (i.e. the nature of the main component of the carrier fluid as well as the nature and amount of surface-active compound or other polarity-modifying component optionally added to the carrier fluid), the flow rate of the carrier fluid, the nature of the droplet fluid (i.e. the nature of the main component of the droplet fluid as well as the nature and amount of surface-active compound or other polarity-modifying component optionally added to the droplet fluid) and the aspect ratio of the droplet.

Then, using this abacus, it is possible to select appropriate conditions for promoting or preventing the merging of droplets in the channel area, depending also on the length of the channel area and the initial distance between the droplets (at the inlet of the channel area), when the carrier fluid flows in a given direction. In particular, if the droplet of first fluid has a relative velocity $\beta_1$, the droplet of second fluid has a relative velocity $\beta_2$, and the initial distance between the droplets at the inlet of the channel area is $\Delta S_i$, a reference distance $\Delta S_m$ can be defined as $\Delta S_m = \Delta S_i/(|\beta_1 - \beta_2|)$. Then, since the droplet of first fluid travels ahead of the droplet of second fluid:

if $\beta_1 \geq \beta_2$, coalescence is prevented in the channel area;

if $\beta_1 < \beta_2$, coalescence occurs when the first droplet has traveled a distance equal to $\beta_1 \times \Delta S_m$ and when the second droplet has traveled a distance equal to $\beta_2 \times \Delta S_m$, provided that the length of the channel area is more than $\beta_2 \times \Delta S_m$, or coalescence in the channel area is prevented if the length of the channel area is less than $\beta_2 \times \Delta S_m$.

In some embodiments, the interfacial tension of at least one of the first fluid and second fluid with the carrier fluid is adjusted, so that the absolute difference $|\beta_1-\beta_2|$ is smaller than a predefined value, to prevent plug coalescence. This predefined value may in particular be the ratio of the initial distance between the droplets at the inlet of the channel area to the length of the channel area.

In some embodiments, the interfacial tension of at least one of the first fluid and second fluid with the carrier fluid is adjusted, so that the absolute difference $|\beta_1-\beta_2|$ is larger than a predefined value. This predefined value may in particular be the ratio of the initial distance between the droplets at the inlet of the channel area to the length of the channel area.

In some embodiments, the absolute difference $|\beta_1-\beta_2|$ is from 0 to 0.01, or from 0.01 to 0.02, or from 0.02 to 0.05, or from 0.05 to 0.1, or from 0.1 to 0.2, or from 0.2 to 0.5, or from 0.5 to 1.

In some embodiments, the absolute difference $|\beta_1-\beta_2|$ is adjusted by any combination of:
- increasing the concentration of a surface-active compound in the droplet of first fluid (preferably to favor coalescence);
- decreasing the concentration of a surface-active compound in the droplet of first fluid (preferably to avoid coalescence);
- increasing the concentration of a surface-active compound in the droplet of second fluid (preferably to avoid coalescence);
- decreasing the concentration of a surface-active compound in the droplet of second fluid (preferably to favor coalescence).

Reversal of Flow

Based on the explanations provided above, it is possible to promote coalescence between two droplets, if a droplet of first fluid travels in the channel area ahead of (i.e. in front of) a droplet of second fluid, and the relative velocity of the droplet of first fluid is lower than the relative velocity of the droplet of second fluid; and it is possible to prevent coalescence between two droplets, if a droplet of first fluid travels in the channel area ahead of (i.e. in front of) a droplet of second fluid, and the relative velocity of the droplet of first fluid is higher than the relative velocity of the droplet of second fluid (or if the relative velocity of the droplet of first fluid is higher than the relative velocity of the droplet of second fluid, but the length of the channel area is insufficient for the droplet of second fluid to catch up with the droplet of first fluid, in view of the initial spacing between the droplets).

However, in some cases, it is desirable to promote the merging of droplets although a droplet of first fluid travels in the channel area ahead of a droplet of second fluid, and the relative velocity of the droplet of first fluid is higher than the relative velocity of the droplet of second fluid; or although the relative velocity of the droplet of first fluid is lower than the relative velocity of the droplet of second fluid, but the length of the channel area is insufficient for the droplet of second fluid to catch up with the droplet of first fluid, in view of the initial spacing between the droplets. Conversely, in some cases, it is desirable to prevent the merging of droplets although a droplet of first fluid travels in the channel area ahead of a droplet of second fluid, and the relative velocity of the droplet of first fluid is lower than the relative velocity of the droplet of second fluid.

It may not be practicable or convenient to adjust the contents of the droplet fluids or the aspect ratios of the droplets, or to modify the order of droplets in the channel, so as to promote or prevent coalescence in all of these circumstances. By implementing a reversal of direction of flow, the invention overcomes these limitations.

In particular, it has been found that the factor $\beta$ generally increases with the carrier fluid flow rate more rapidly for "faster" droplets than "slower" droplets, as illustrated in the example section.

The present invention makes it possible to address the above needs by displacing the droplet of first fluid and the droplet of second fluid along the channel area, successively
(a) by a flow of carrier fluid in a first direction and at a first flow rate; and
(b) by a flow of carrier fluid in a second direction opposite to the first direction, and at a second flow rate different from the first flow rate.

The first direction is typically from the inlet of the channel area to the outlet of the channel area, and the second direction is typically from the outlet of the channel area to the inlet of the channel area.

In some embodiments, the first flow rate is larger than the second flow rate.

In other embodiments, the first flow rate is smaller than the second flow rate.

In some embodiments, the ratio of the first flow rate to the second flow rate is from 1.05 to 1.1, or from 1.1 to 1.5, or from 1.5 to 3, or from 3 to 6, or even from 6 to 100.

After step (b), the flow of carrier fluid may again be reversed to the first direction, at the first flow rate or at any other flow rate.

Repeated successions of steps (a)-(b) may be used, wherein the same first flow rate is used at each step (a) and the same second flow rate is used at each step (b), or different flow rates are used in the various steps (a) and/or (b). After the final step (b), the flow of carrier fluid may again be reversed to the first direction, at the first flow rate or at any other flow rate.

Most preferably, the droplets remain within the channel area during steps (a) and (b) and the optional repeats of steps (a) and (b).

Merging of the droplets may in particular occur during step (b) (or during a step (b) if there are several sequences of steps (a)-(b)).

In some embodiments, during step (a) a droplet of first fluid travels ahead of a droplet of second fluid (according to the first direction), the velocity of the droplet of first fluid being larger than the velocity of the droplet of second fluid; and during step (b) the droplet of second fluid travels ahead of the droplet of first fluid (according to the second direction), the velocity of the droplet of first fluid being larger than the velocity of the droplet of second fluid. The second flow rate is preferably larger than the first flow rate. The duration of step (b) is preferably shorter than the duration of step (a). This configuration can be used to promote merging between the droplets, during step (b). It is in particular useful when the first fluid has a lower interfacial tension than the second fluid with the carrier fluid. In some cases, several sequences of these steps (a)-(b) may be repeated until merging occurs within the channel area, during a step (b).

The higher the ratio of the first flow rate to the second flow rate, the shorter the distance on which coalescence can occur, but the longer the time needed for coalescence to occur, because of the slow motion in one direction. Based on the methodology set forth in the examples, the skilled in the art will be able to select the best ratio depending on the application.

In some embodiments, during step (a) a droplet of first fluid travels ahead of a droplet of second fluid (according to the first direction), the velocity of the droplet of first fluid being smaller than the velocity of the droplet of second fluid; and during step (b) the droplet of second fluid travels ahead of the droplet of first fluid (according to the second direction), the velocity of the droplet of first fluid being smaller than the velocity of the droplet of second fluid. The second flow rate is preferably larger than the first flow rate. The duration of step (b) is preferably shorter than the duration of step (a). This configuration can be used to prevent merging between the droplets. It is in particular useful when the first fluid has a higher interfacial tension than the second fluid with the carrier fluid. Several sequences of these steps (a)-(b) may be repeated so as to move the droplets from the inlet to the outlet of the channel area without merging.

In some variations, in addition to merging the droplet of first fluid with the droplet of second fluid, further coalescence can also be performed with a droplet of a third fluid traveling behind the droplet of second fluid, the relative velocity of the droplet of third fluid being optionally lower than the relative velocity of the droplet of second fluid; and optionally with a droplet of a fourth fluid traveling behind the droplet of third fluid, the relative velocity of the droplet of fourth fluid being optionally lower than the relative velocity of the droplet of third fluid; etc.

What is explained above in connection with the coalescence of two droplets is also applicable mutatis mutandis to the coalescence of three, four or more droplets.

In some variations, in addition to transporting the droplet of first fluid with the droplet of second fluid without merging, a further droplet of a third fluid can travel behind the droplet of second fluid, the relative velocity of the droplet of third fluid being optionally higher than the relative velocity of the droplet of second fluid, without any merging of the droplet of third fluid; and a further droplet of a fourth fluid can travel behind the droplet of third fluid, the relative velocity of the droplet of fourth fluid being optionally higher than the relative velocity of the droplet of third fluid, without any merging of the droplet of fourth fluid; etc.

The promotion and prevention of coalescence may be combined in some embodiments. For instance, a droplet of first fluid, a droplet of second fluid and a droplet of third fluid may travel, in this order, along the channel area during step (a); the droplet of first fluid may merge with the droplet of second fluid (either during a step (a) or during a step (b)), whereas the droplet of third fluid does not merge. Or a droplet of first fluid, a droplet of second fluid and a droplet of third fluid may travel, in this order, along the channel area during step (a); the droplet of second fluid may merge with the droplet of third fluid (either during a step (a) or during a step (b)), whereas the droplet of first fluid does not merge.

Once two droplets of fluids A and B have merged, they are considered as a single droplet of a fluid C resulting from the addition of fluids A and B.

Applications

In some embodiments, the first fluid contains at least a first reagent and the second fluid contains at least a second reagent. The third, fourth, etc. fluids, if present, may also contain at least a third, fourth, etc. reagent.

By promoting the merging of droplets as described above, these reagents may be put into contact.

Alternatively, by preventing merging of the droplets as described above, these reagents may be kept separate, which is useful for instance when the droplets are used as microcompartments to perform independent assays.

The reagents may in particular be analytes, substrates or ligands, such as chemical or biological species. The analytes or substrates may be molecules, ions, atoms, macromolecules or colloidal objects. Generally, the word "analyte" is used for species that it is intended to analyze without modifying them, and "substrate" for species that it is intended to modify.

The analytes and substrates used in the invention may for example be nucleic acids, polypeptides, amino acids, chemical compounds such as drugs, enzymes, catalysts or cells or living organisms.

The term nucleic acid designates natural nucleic acids (for example DNA and RNA), but also modified or artificial nucleic acids such as block nucleic acids, peptide nucleic acids, thiolated nucleic acids, and others. It comprises genomic, ribosomic and mitochondrial nucleic acids, nucleic acids of pathogenic organisms, messenger RNA, micro-RNA and medicinal nucleic acids.

The term polypeptide is taken in its general sense and designates any molecule or molecular assembly comprising at least one sequence of amino acids, in particular natural and artificial proteins, protein fragments, protein complexes, enzymes, antibodies, glycopeptides, glycoproteins and chemical and biochemical modifications of these.

Colloidal objects means organic or inorganic compounds, either natural or artificial, such as cells, organelles, viruses, aggregates of cells, islands of cells, embryos, pollen grains, natural or artificial organic particles (for example made from polymer latex), dendrimers, vesicles, magnetic particles, quantum dots, metallic particles, organometallic particles, metal oxide particles, ceramic particles, silica particles, glass particles, organic liquids, hydrogels, nanotubes, natural or artificial macromolecules, microgels, macromolecular aggregates, proteins or protein aggregates, polynucleotides or polynucleotide aggregates, nucleoprotein aggregates, polysaccharides, supramolecular assemblies or combinations of these.

Cells of particular interest in the present invention may in particular be bacteria, molds, eukaryotic cells, in particular circulating tumor cells, hematopoietic cells, red blood cells, circulating endothelial cells, parasites or circulating fetal cells.

Ligands of particular interest for implementing the invention are antibodies, metals, histidine, hydrophobic groups, hydrogen-bond groups, protein A, loaded nucleic acid sequences, polyelectrolytes, phospholipids, chemical compounds, medicines, fluorescent groups, luminescent groups, dyes, nanoparticles (in particular made of gold), quantum dots, DNA intercalating agents, aptamers, mixtures used for DNA amplification, and species able to affect the metabolism of cells or the properties (in particular the optical properties) of colloidal objects.

A ligand may optionally be bonded to a fluorophore, or to an enzyme.

The invention may be applied to perform chemical, biochemical or biological reactions, such as in particular catalytic reactions, hybridizations, electrochemical reactions, enzymatic reactions, immunoassays, chemiluminescent reactions, immunological captures, affinity captures, purifications, concentrations, extractions and combinations of these.

According to some embodiments, the invention is implemented in the context of immunoassay methods, or genetic testing or ELISA testing.

According to some embodiments, the invention is implemented in the context of an analysis comprising a nucleic acid amplification, for example an isothermal amplification by PCR.

The invention may be implemented in the context of research, diagnosis, analysis, synthesis or quality control devices and methods, in medicine, biology, life sciences, the food industry, the cosmetics industry, pharmacy, legal analysis, safety, biosafety, the energy industry (in particular for handling radioactive materials) or chemistry.

The invention may in particular be implemented in diagnostic devices and methods, in particular for the diagnosis of infectious illnesses, cancers, cardiovascular diseases, or prenatal diagnosis. It may also be integrated in devices and methods for quality control, or for controlling contaminations, in particular bacterial, viral or chemical, in the food, energy (particularly nuclear), water quality, chemistry, environment and safety (in particular bio-safety) fields.

EXAMPLES

The following examples illustrate the invention without limiting it.

Example 1—Experimental Setup to Measure Droplet Velocity

Figure 2:
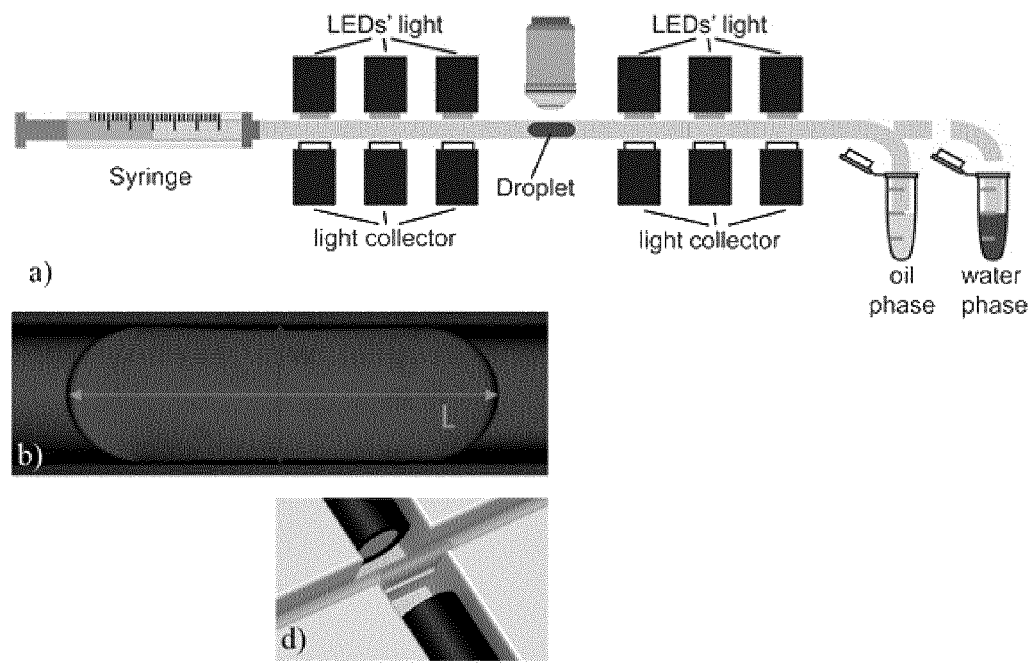
FIG. 2 shows: (a) a schematic depiction of an exemplary device that can be used to measure the velocities of droplets of various sizes and compositions in a tubing; (b) a photograph of a droplet within the device, having a length L and a width w; (c) the signal of a droplet passing in front of a detector (time in s on the X-axis, voltage of the detected signal in V on the Y-axis); (d) a schematic depiction of one detector for detecting droplets passing in the tubing; (e) a graph showing all detections within the device performed at various flow rates of the carrier fluid (time in s on the X-axis, distance in mm on the Y-axis), which makes it possible to fit the velocity of the droplet depending on the flow rate of the carrier fluid.
Figure 2:
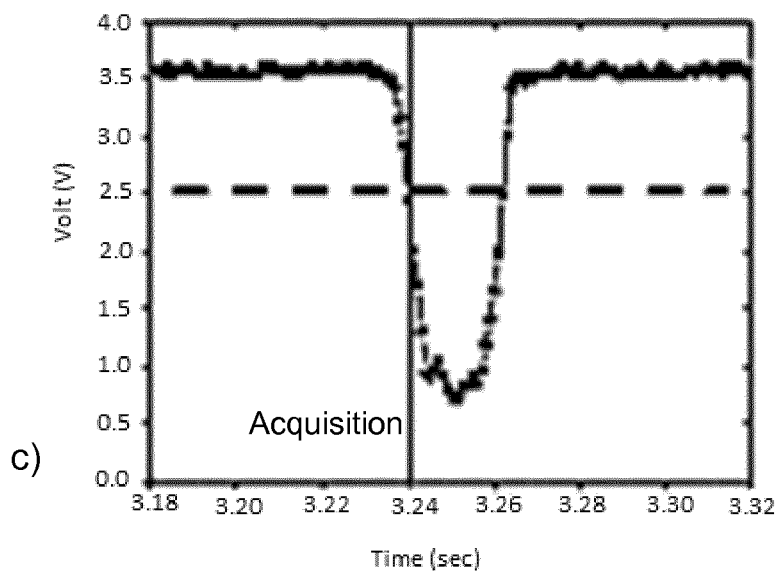
Figure 2:
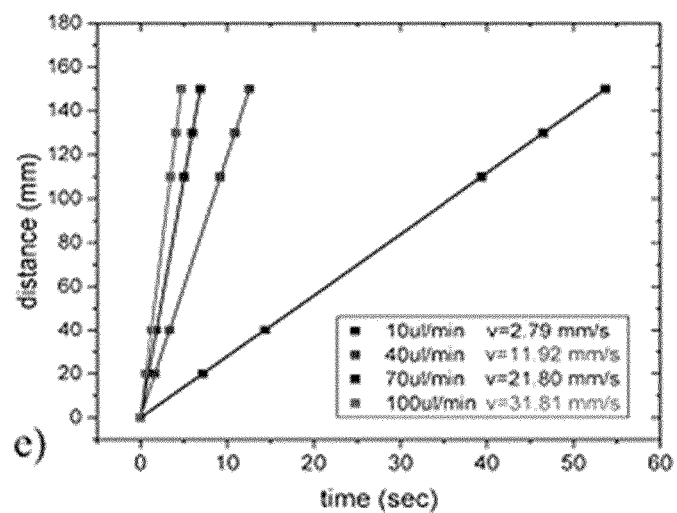

The experimental setup used in the various examples for measuring the velocity of droplets is shown in FIG. 2a: water-phase droplets were generated by pipetting in a PTFE tubing (inner/outer diameter 0.3/0.6 mm), using a 100 µL syringe (100F-LL-GT, by SGE), controlled by a syringe pump (PHD 22/2000, by Harvard apparatus) and pre-filled with an oil phase. One extremity of the tubing was connected with the syringe, while the other was moved between two conventional PCR tubes containing the oil and the water solutions to be investigated. Droplets having volumes between 15 nL and 300 nL were generated. After being generated, each droplet was flowed through the tubing and its velocity was recorded by a series of six optical detectors. To this end, two optical fibers, coupled with a LED (Radiospares) and a photodiode (OPT101, by Texas Instruments), were respectively used to bring and collect the light passing through the tubing (see FIG. 2d). Therefore, each droplet passing between the fibers screened the optical signal, which showed a negative peak (see FIG. 2c). This signal was collected by an Arduino board and the timing of this event was recorded by a customized program developed by LabVIEW (National Instruments). Therefore, plotting the detector positions as a function of the acquired time, the droplet velocity was evaluated by a linear fit of the data (see FIG. 2e). Finally, in order to fix the position of the fibers, everything was held by a 3D printed structure placed under an optical microscope and coupled with a camera. In this way, droplet images were recorded during the experiments (see FIG. 2b).

Example 2—Experimental Setup to Watch Coalescence of Droplets

Figure 3:
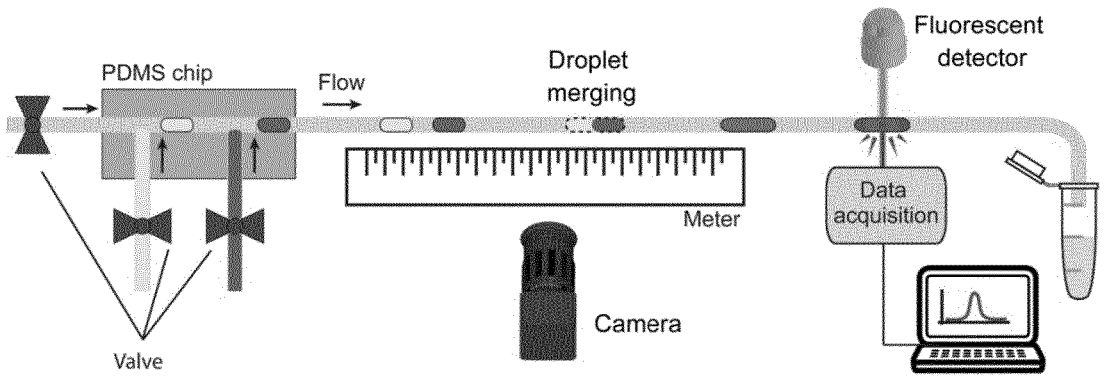
FIG. 3 schematically shows an exemplary device used to induce and monitor coalescence between droplets.

The setup shown in FIG. 3 was used in the following examples to evaluate the capability of triggering droplet merging. It was composed of a microfluidic device produced by conventional replica molding by "soft lithography" of a master produced by micromilling as taught by Guckenberger et al. Lab Chip, 15:2364-2378 (2015). The chip had two T-junctions making it possible to generate series of pairs of droplets having different contents. Additionally, the inlets of the device were connected to a pressure controller and flows were regulated by three customized micro-valves for droplet on demand generation, described in Ferraro et al., Sensors and Actuators B: Chemical, 258:1051-1059 (2018), allowing the independent control of the space between the droplets, of the droplet sizes and velocity of continuous phase. After being generated, the droplets were flowed out of the device in the cylindrical PTFE tubing, which is fixed to a meter. The measurement of the merging position was made by a movable camera (Nikon D3300).

Example 3—Materials Used

In the various experiments, the continuous phase was Fluorinert FC40 oil, optionally containing 2% of 1H, 1H, 2H, 2H-perfluoro-1-decanol (designated as FC40+S).

The dispersed phase used for the droplets was either pure milliQ-water or milliQ-water complemented by glycerol, ethanol or Tween 20 surfactant. The following properties were determined for the dispersed phase:

| Dispersed phase | Interfacial tension with FC40 (mN/m) | Interfacial tension with FC40 + S (mN/m) | Viscosity (cP) | Viscosity ratio of dispersed phase relative to continuous phase |
|---|---|---|---|---|
| milliQ water | 51.2 ± 0.3 | 14.9 ± 0.2 | 0.9579 | 0.23 |
| Glycerol 49% | | 15.3 ± 0.3 | 4.8242 | 1.2 |
| Glycerol 67% | | 15.6 ± 0.3 | 14.925 | 3.6 |
| EtOH 4% | 40.37 | | | |
| EtOH 12% | | 13.08 ± 0.04 | 1.563 | 0.38 |
| EtOH 15% | 27.28 | | | |
| EtOH 25% | | 7.36 ± 0.02 | 2.37 | 0.58 |
| EtOH 30% | 17.64 | | | |
| EtOH 50% | | 4.00 ± 0.07 | 2.813 | 0.69 |
| Tween 20 0.001% | 13.1 ± 0.4 | 0.95 | 0.23 | |
| Tween 20 0.00125% | 40.9 | | | |
| Tween 20 0.005% | 30.5 | | | |
| Tween 20 0.01% | 18.8 | 7.3 ± 0.2 | 0.951 | 0.23 |
| Tween20 0.5% | 18 | | | |
| Tween 20 1% | 17.6 | 5.16 ± 0.06 | 1.02 | 0.25 |
| Tween 20 6% | 17.3 | 4.68 ± 0.08 | 1.03 | 0.26 |
| Tween 20 12% | 16.1 | | | |

Example 4—Measurement of Velocity Ratio Versus Droplet Size

The system described in Example 1 was used. During a single run of measure, a single droplet was flowed at least 6 times back and forth in the tubing. β was calculated as the velocity of the droplet V divided by the average velocity of the oil phase $U=F/\pi r^2$, where r is the tubing radius and F is the flow rate. Since the flow rate depends on the syringe diameter, real values of F were evaluated by weighing the quantity of liquid flowing out the capillary in various amounts of time. The tubing radius r was measured by optical observation to be r=144.5±0.5 µm. Droplet widths w are defined as w=2r. Finally, droplet lengths (L) were measured at the beginning and at the end of the acquisition in static condition by microscope. The aspect ratio $\ell$ is defined as L/w.

Figure 4A:
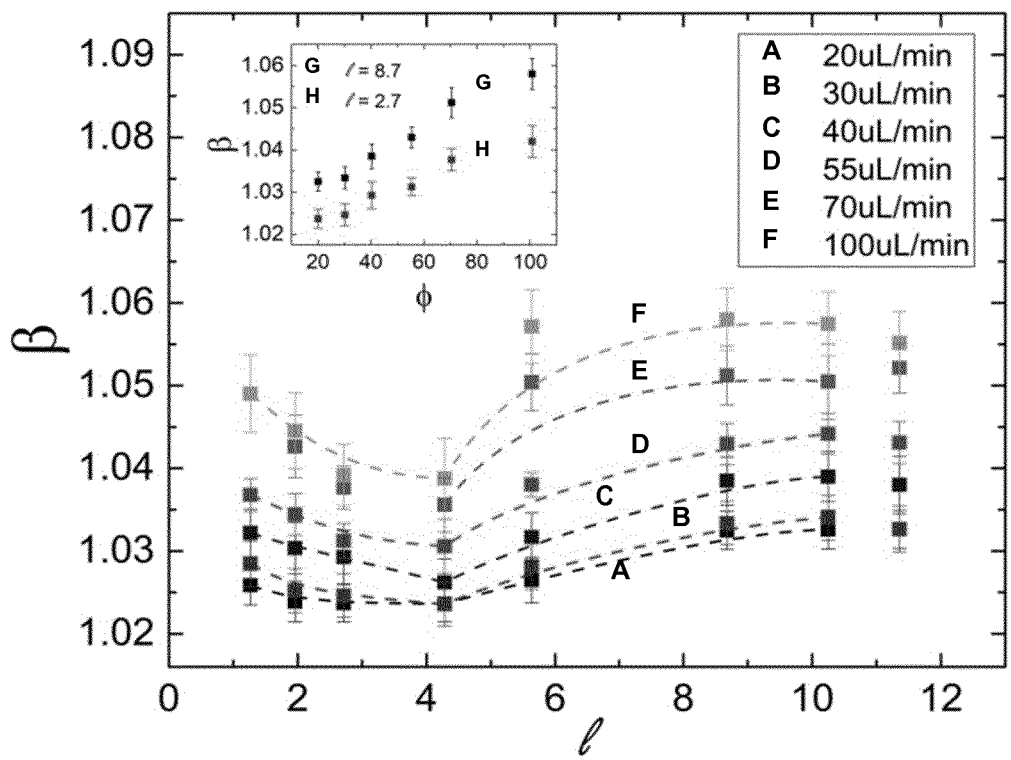
FIG. 4a is a graph showing the velocity ratio β of droplets as a function of the droplet aspect ratio $\ell$ for different carrier fluid flow rates.

FIG. 4a reports β as a function of the aspect ratio $\ell$ using only water as the dispersed phase, at various flow rates F. It can be observed that R is always larger than 1, meaning that the droplet velocity V is higher than the averaged flow velocity U. Besides, the higher F is, the higher β is. The trend is the same for all values of F which were investigated. β decreases as a function of the aspect ratio $\ell$, up to a critical value (about $\ell$ =5) and then increases again, reaching a plateau. The insert shows the value of β for two values of I at increasing flow rates φ (in µl/mn), showing that the ratio β increases with the flow rate and the aspect ratio.

Figure 4B:
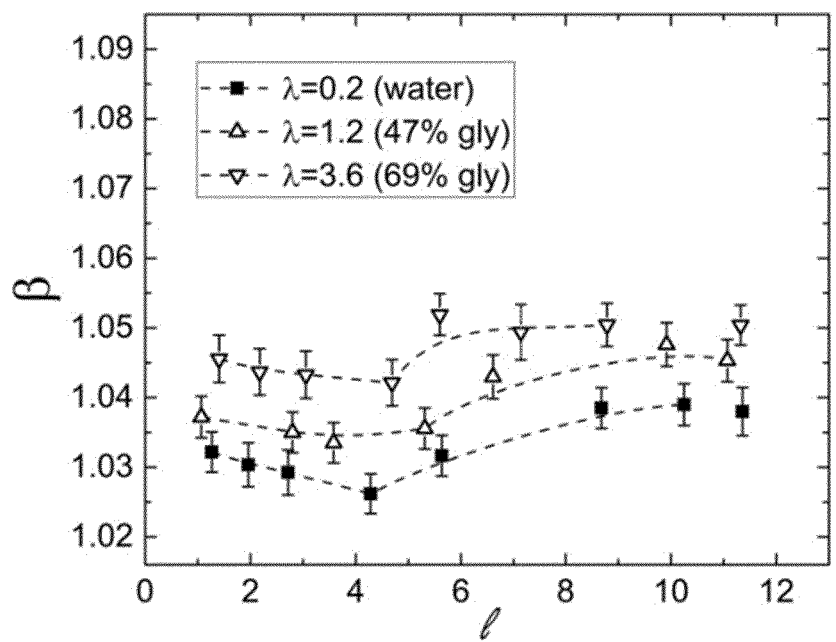
FIG. 4b is a graph showing the velocity ratio β of droplets as a function of the droplet aspect ratio $\ell$ for different viscosity ratios λ between the droplet and the carrier fluid.

FIG. 4b reports β as a function of the aspect ratio $\ell$ using various fluids for the dispersed phase, namely water or water complemented with glycerol.

Example 5—Measure of Velocity Ratio Versus Droplet Composition

FIG. 5a-5e show several examples of curves illustrating the velocity ratio factor β as a function of the droplet aspect ratio $\ell$ for different types of carrier fluids, different carrier fluid flow rates, and different compositions of the droplets. These curves were obtained with the device and methodology of example 1. They can to promote or prevent coalescence according to the invention. FIG. 6a-6b show similar curves, but plotted this time as a function of the interfacial tension γ between the droplets and the carrier fluid (in mN/m). These curves may be used in the same manner as those of FIG. 5a-5e. Because γ is a more general parameter, which can be obtained by methods well known in the art, such as e.g. the pending drop method, these curves can be used to apply the method of the invention without having to resort to the method described in Example 1.

Figure 5A:
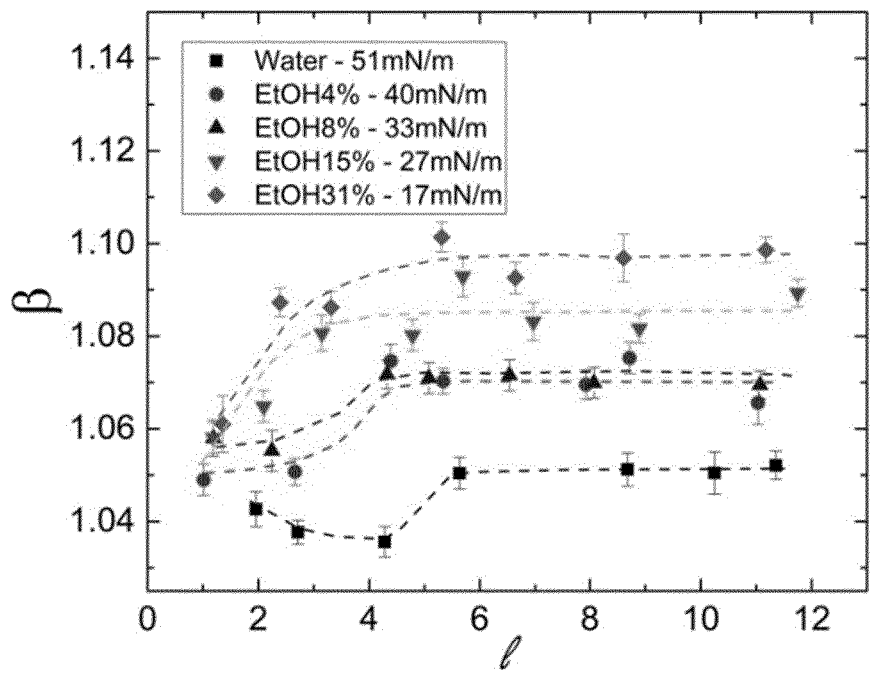
FIG. 5a is a graph showing the velocity ratio β of droplets as a function of the droplet aspect ratio $\ell$ for different droplet fluids (water supplemented with various amounts of ethanol), the flow rate of the carrier fluid being 40 μL/min.
Figure 5B:
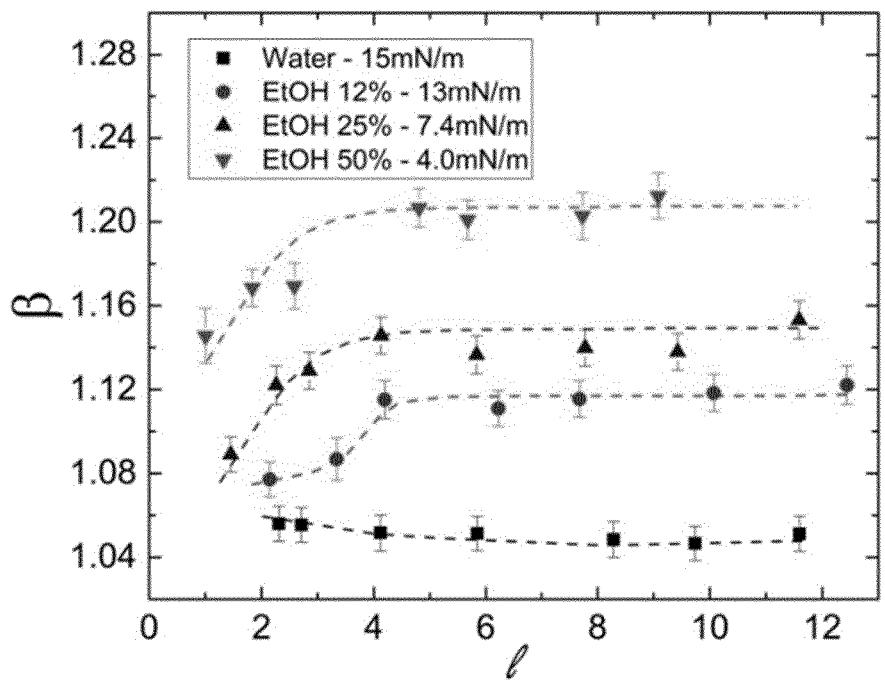
FIG. 5b is a graph similar to FIG. 5a, the flow rate of the carrier fluid being 100 μL/min.
Figure 5C:
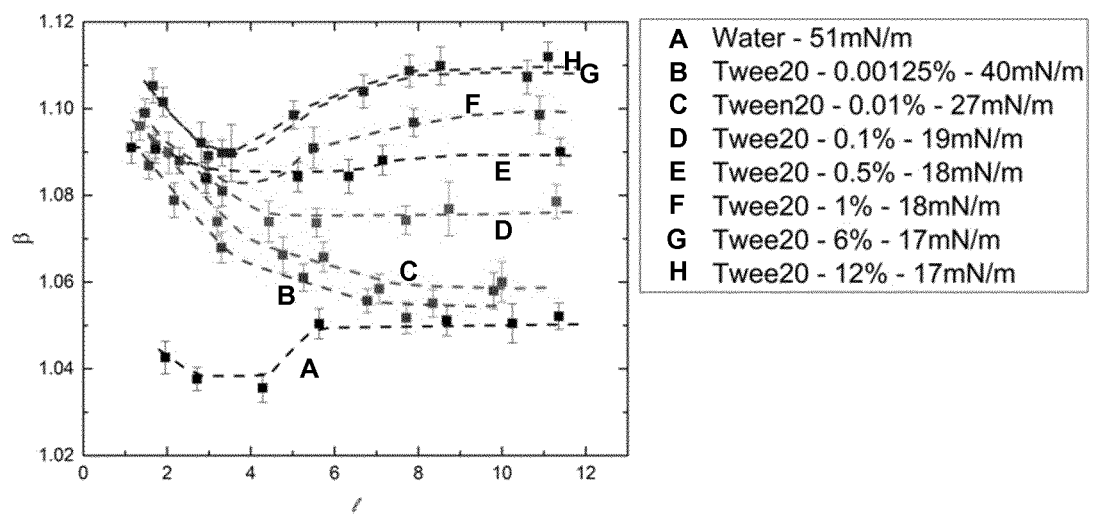
FIG. 5c is a graph showing the velocity ratio β of droplets as a function of the droplet aspect ratio $\ell$ for different droplet fluids (water supplemented with various amounts of Tween 20 surfactant), the flow rate of the carrier fluid being 40 μL/min.
Figure 5D:
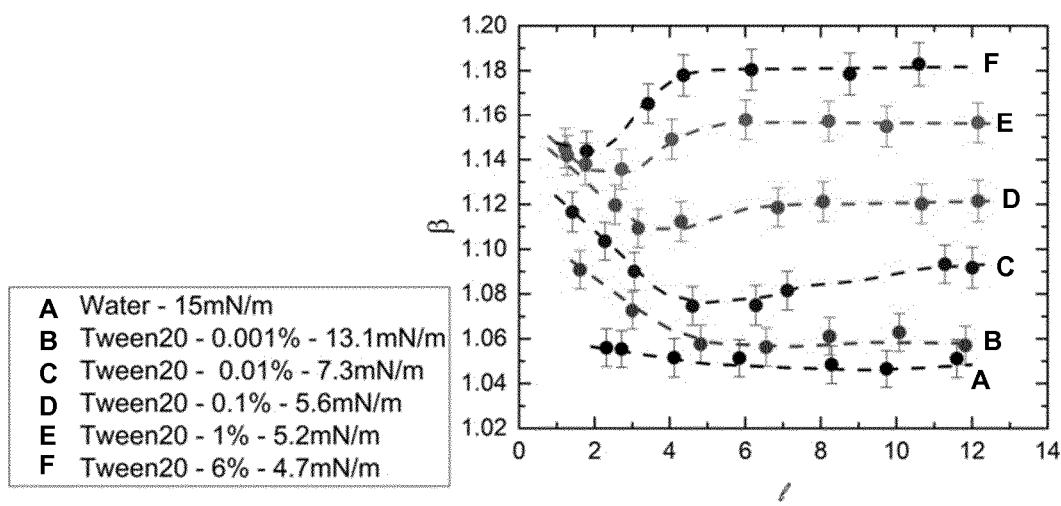
FIG. 5d is a graph similar to FIG. 5c, the flow rate of the carrier fluid being 100 μL/min.
Figure 5E:
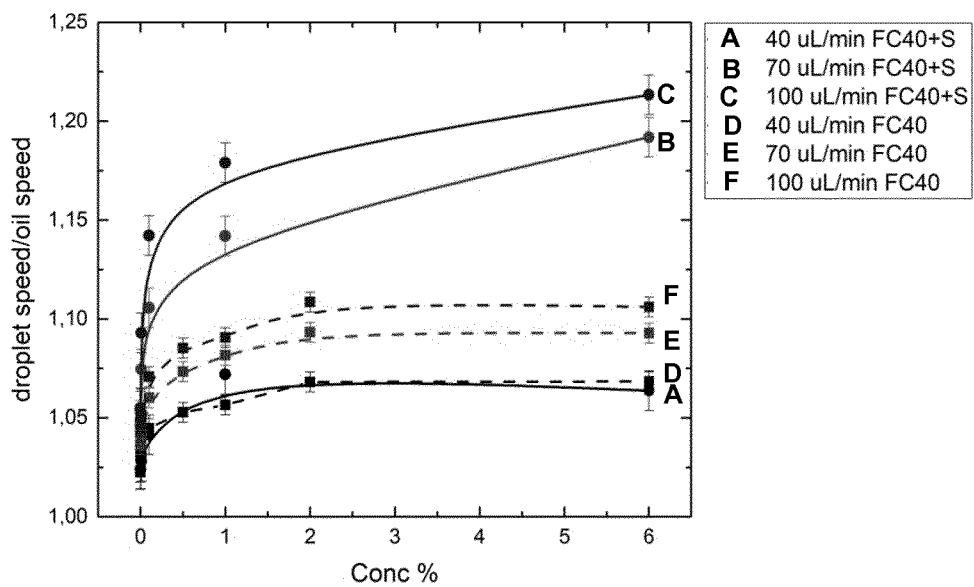
FIG. 5e is a graph showing the velocity ratio β of droplets as a function of the Tween 20 surfactant content of the droplet fluid, at various carrier fluid flow rates and two types of carrier fluids, pure FC40, and FC40+2% of 1H, 1H, 2H, 2H-perfluoro-1-decanol.
Figure 5E:
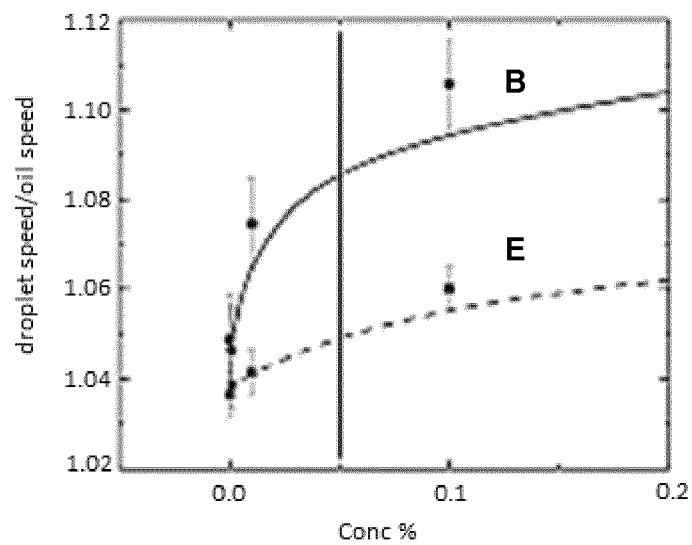
Figure 6A:
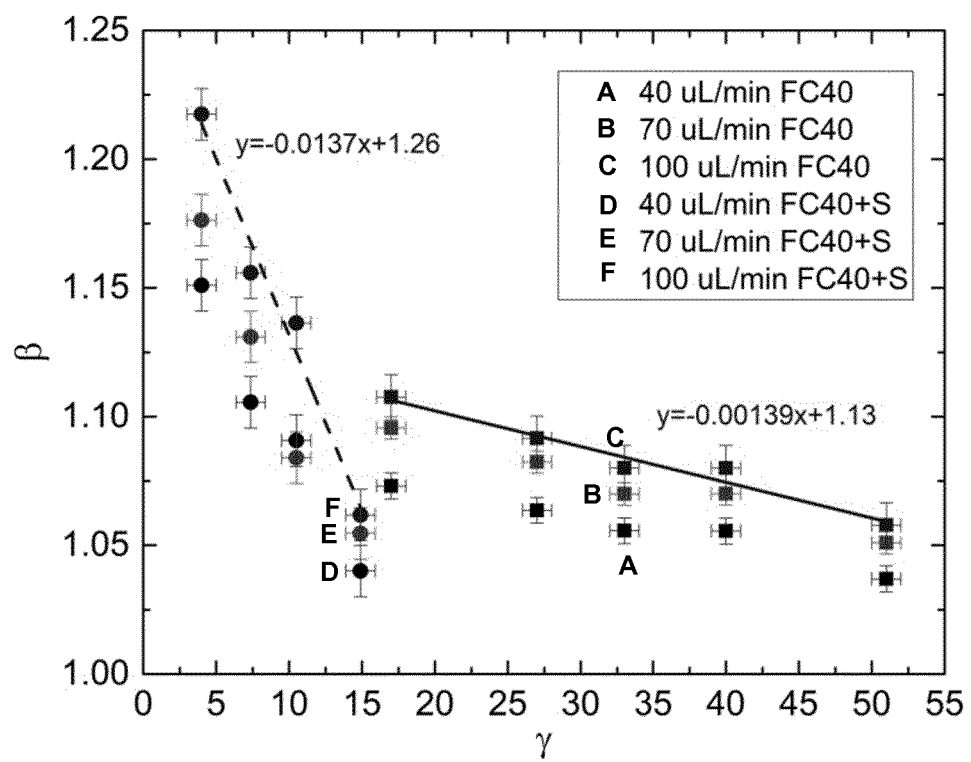
FIG. 6a is a graph showing the velocity ratio β of droplets as a function of the interfacial tension with the carrier fluid, for different carrier fluid flow rates, and two types of carrier fluids, pure FC40, and FC40+2% of 1H, 1H, 2H, 2H-perfluoro-1-decanol, the droplet fluid being water containing various amounts of ethanol.
Figure 6B:
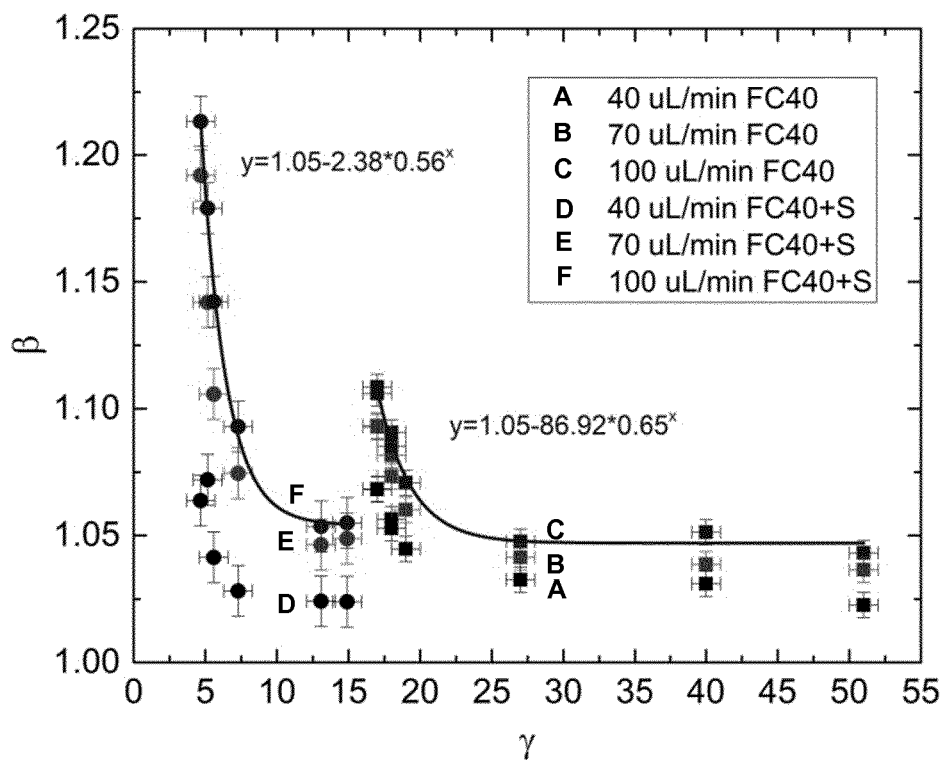
FIG. 6b is similar to FIG. 6a, the droplet fluid being water containing various amounts of Tween 20 surfactant.

In FIG. 5e, right panel, the factor β of droplet velocity versus oil velocity is provided as a function of surface-active compound concentration, the cmc being indicated as a straight vertical line.

Example 6—Inducement of Coalescence

The results of Examples 4 and 5 obtained in the device of Example 1 were used to induce droplet coalescence in the device of Example 2 in controlled conditions.

Figure 7A:
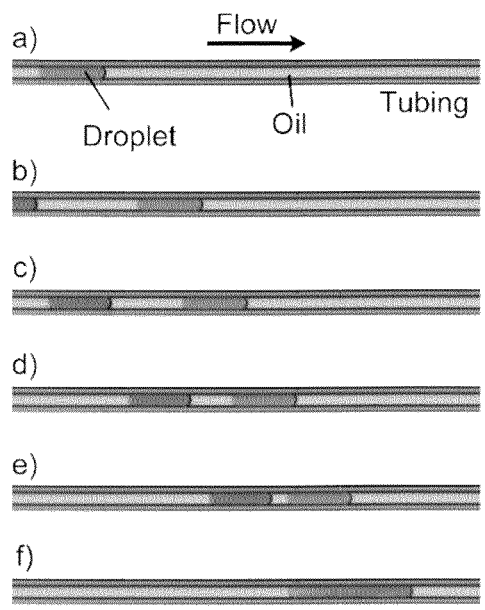
FIG. 7a schematically shows the induction of coalescence in a straight cylindrical tube according to the invention.
Figure 7B:
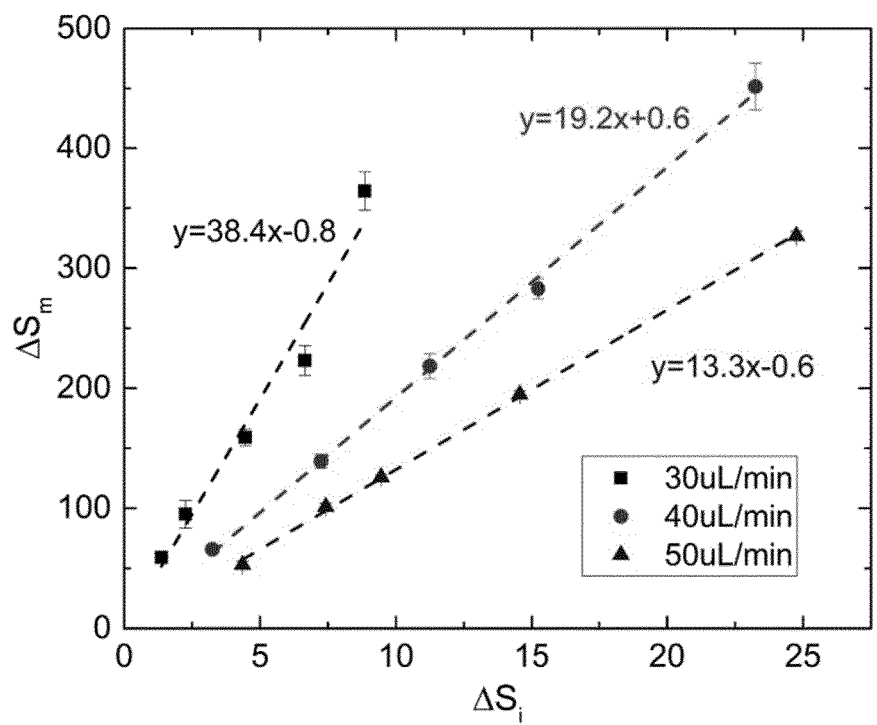
FIG. 7b is a graph showing the distance $\Delta S_m$ along the channel area (Y-axis in μm) required to induce coalescence between two droplets as a function of the initial distance $\Delta S_i$ between the droplets (X-axis in μm), for various flow rates of the carrier fluid.

Using FC40+S as the continuous oil phase, pairs of droplets containing i) pure water and ii) water phase containing 1% of Tween20 surfactant were generated. Droplets ii) flow faster than droplets i), resulting in a fusion after having travelled a certain distance ($\Delta S_m$). FIG. 7a shows a time sequence of the motion of two droplets having different surface-active compound contents, and FIG. 7b shows the distance travelled by the droplets before merging ($\Delta S_m$) as a function of the initial generation space ($\Delta S_i$), for three different flow rates F of the continuous phase. This distance is linearly proportional with the initial distance between the two droplets ($\Delta S_i$). Therefore, the merging can be triggered by adjusting this value and the flow rate of the continuous phase, which changes the slope of the fits.

Example 7—Implementation of the Invention

The experiments in this example were performed in a PTFE capillary (OD 1 mm, ID 500 µm, BOHLENDER GmbH) connected on one side to a syringe pump (SPM, Advanced Microfluidics SA) and on the other side to a pipetting robot (Rotaxys, CETONI GMBH).

A first series of droplets of volume 1 µl containing a food dye solution prepared by a stock solution diluted at 1, 1/6, 1/12, 1/24 and 1/48 (respectively concentrations C1, C2, C3, C4 and C5), were pipetted in the capillary, separated with oil plugs of 0.5 µL. The food dye stock solution was prepared from dye PatisDecor P1160 (strawberry) diluted to 1/1200). The oil was Fluorinert FC40 (3M), containing 2% of 1H, 1H, 2H, 2H-perfluoro-1-decanol surfactant. All droplets were driven in the capillary by an oil flow rate of 50 µL/min. It was observed that, the more concentrated the dye in the droplet, the faster the droplet moves. Thus, putting the more concentrated droplet ahead during the motion did not allow any droplet merging.

In a second series of tests, droplets with the same concentrations were pipetted in the reverse order, the less concentrated droplet moving ahead. In this configuration, droplets with dilutions 1/12, 1/6 and 1 merged.

In a third series of tests, a flow reversal protocol was applied. A first droplet containing food dye at concentration C1 was sampled. A plug of 0.2 µL of oil was pipetted, and a second droplet at concentration C2 was sampled, all in the "forward" direction (from the sampling inlet to the syringe). The two droplets were transported in the observation area of the setup with the architecture presented in FIG. 3, by pipetting an additional 10 µL of oil, at a flow rate of 20 µL/min. Then the flow was reversed ("reverse" flow direction), and 5 µL of oil were ejected from the capillary, at a flow rate of 200 µL/min. Under these conditions, the droplets merged, in spite of the fact that the droplet at concentration C1 (faster) was introduced in the capillary ahead of the droplet at concentration C2 (slower).

The same procedure can be repeated with other pairs of droplets, in which the droplet with the higher food dye concentration is injected in the capillary ahead of the droplet with lower food dye concentration. Optionally, if droplets do not merge upon the first flow reversal, several sequences of the flow reversal protocol can be repeated by alternating flow for 5 µL of oil at 200 µL/min in the reverse direction followed by flow of 5 µl of oil at 20 µl/min in the forward direction, until merging is achieved.

Example 8—Application of the Invention to DNA Amplification by PCR

Figure 8:
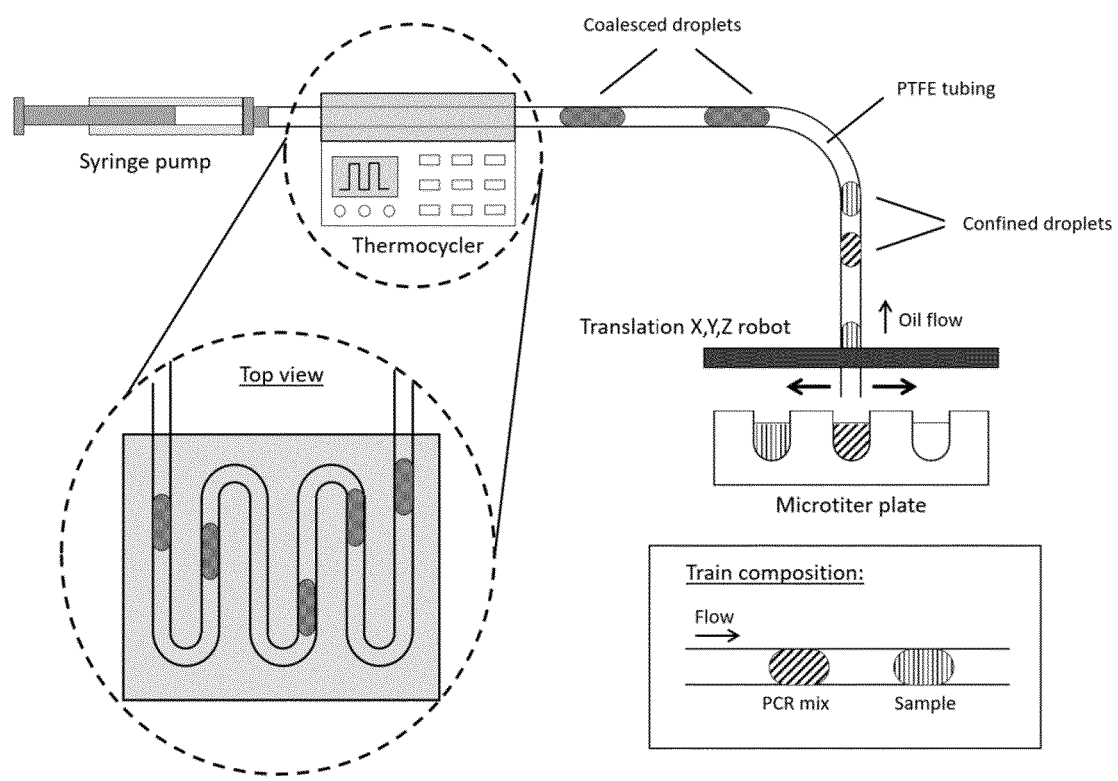
FIG. 8 schematically shows an exemplary device to implement the invention for DNA amplification by PCR.

The droplet microfluidic platform for PCR, shown in FIG. 8, is composed of two sequential modules: i) a droplet generator, ii) a thermocycler. Module i) is composed of a pipetting robot coupled with a syringe pump, allowing the generation of deterministic trains of confined droplets by pipetting the different solutions from a conventional microtiter plate (MTP), as described in Ferraro et al., Sci. Rep. 6:25540 (2016) and Chabert et al., Anal. Chem., 78:7722-7728 (2006).

Pairs of droplets (volume V=100 nL) containing the sample to be analyzed (DNA or cells) and the PCR enzymes mix were continuously produced, separated by an oil gap of the same volume. The droplets were then transported as train wagons in a PTFE tubing (0.3/0.6 mm inside/outside diameter) in a continuous flow of FC-40+S.

Both droplets had different contents of surface-active compound, and it was observed that the sample droplets traveled at a lower velocity than the RT-PCR mix solution. Therefore, by pipetting the sample droplet at first, the mutual distance between the two droplets decreased along their path until the first droplet was reached by the second droplet containing the PCR mix. Furthermore, the specific surface-active compound dispersed in the continuous phase ensured droplet stability during the flow, but did not prevent their merging once in contact with each other. In particular, when the oil volume spacing between the two droplets was fixed to V=100 nL, approx. 1.4 mm, merging occurred a few cm after the generation.

The volume between the different pairs of droplets was fixed at 500 nL. Nevertheless, this oil gap did not influence the experimental workflow since the resulting coalesced droplets are characterized by the same interfacial tension, thus they traveled independently and at a constant rate without experiencing further merging stages.

The coalesced droplets were then driven towards a customized commercial thermocycler where they were stored in order to perform the PCR steps. This stage amplified the DNA sequences by temperature cycling (5+20 min at 60° C., 5+20 min at 95° C.). To implement these operations, a commercial thermocycler (Techne Prime) equipped with a flat plate for glass slides (Techne in situ Hybridization Adapter) was customized by introducing an aluminum part, fabricated by micromilling and characterized by a dug rail with a serpentine configuration, acting as a PTFE tubing holder. A transparent PDMS box was placed over the plate in order to reduce heat convection and improve temperature stability, while keeping the observation of droplets possible. In order to optimize the thermocycling, taking into account thermal conduction effects across the capillary holder, different thermocouples (250 µm diameter, IT-24P, by PHYMEP) were placed in different spots of the holder plate and the thermocycler temperatures were adjusted by trial and error. In order to obtain 60±0.1° C. and 95±0.1° C. in the capillary, the thermocycler temperature had to be fixed at 60.5° C. and 94.3° C., respectively. After amplification, the droplets were collected in Eppendorf tubes and analyzed by an Agilent Bioanalyzer to demonstrate proper amplification.

The invention claimed is:

1. A method of inducing merging between droplets in a channel area, comprising:
   providing a flow of carrier fluid in the channel area;
   providing at least one droplet of a first fluid and at least one droplet of a second fluid within the carrier fluid, the first fluid and the second fluid being immiscible with the carrier fluid;
   displacing the droplet of first fluid and the droplet of second fluid along the channel area, successively
   (a) by flowing the carrier fluid in a first direction and at a first flow rate, wherein the droplet of the first fluid travels ahead the droplet of the second fluid, the droplet of the first fluid has a first relative velocity, the droplet of the second fluid has a second relative velocity, and
      (i) the first relative velocity is greater than the second relative velocity or
      (ii) the second relative velocity is greater than the first relative velocity but the length of the channel area is insufficient for the droplet of second fluid to merge with the droplet of first fluid by flowing the carrier fluid in the first direction and at the first flow rate; and
   (b) by flowing the carrier fluid in a second direction opposite to the first direction, and at a second flow rate different from the first flow rate,
   wherein the droplet of first fluid and the droplet of second fluid merge during step (b).

2. The method of claim 1, wherein the second flow rate is larger than the first flow rate, the ratio of the second flow rate to the first flow rate being from 1.05 to 100.

3. The method of claim 1, comprising repeated sequences of steps (a) and (b).

4. The method of claim 1, comprising, after step (b), a step of:
   (c) displacing the droplet resulting from a merging of the droplet of first fluid with the droplet of second fluid, to make the droplet resulting from merging of the first and the second fluid exit the channel area, by flowing the carrier fluid.

5. The method of claim 1, wherein the first fluid has a first interfacial tension with the carrier fluid and the second fluid has a second interfacial tension with the carrier fluid, the first interfacial tension being lower than the second interfacial tension; or the second interfacial tension being lower than the first interfacial tension.

6. The method of claim 1, wherein the droplet of first fluid has a first length and the droplet of second fluid has a second length in the channel area, and wherein the first length is larger than the second length; or wherein the second length is larger than the first length.

7. The method of claim 1, wherein at least one of the first fluid and second fluid comprises a surface-active compound.

8. The method of claim 7, wherein at least one of the first fluid and second fluid comprise different surface-active compounds or different amounts of same surface-active compounds.

9. The method of claim 1, wherein at least one of the first fluid and second fluid comprises water and a co-solvent.

10. The method of claim 9, wherein the first fluid and second fluid comprise water and different co-solvents or different amounts of same co-solvents.

11. The method of claim 1, wherein the channel area has a substantially constant cross-section along the channel area.

12. The method of claim 1, wherein the channel area has a corner-free cross-section.

13. The method of claim 1, wherein the maximal dimension of the cross-section of the channel area is at least 100 µm.

14. The method of claim 1, wherein the channel area has a circular or ellipsoidal cross-section.

15. The method of claim 1, wherein the channel area is an area of a capillary tube.

16. The method of claim 1, wherein at least one of the droplets has an aspect ratio of more than 2.

17. A method of performing a chemical, biological or biochemical assay, comprising merging droplets according to the method of claim 1, wherein the droplet of first fluid comprises at least a first reagent and the droplet of second fluid comprises at least a second reagent.

18. The method of claim 17, wherein the chemical, biological or biochemical assay is selected from chemical reactions, catalytic reactions, enzymatic reactions, nucleic acid amplifications, hybridizations or polymerizations, immunological reactions, screening of cells, growth of cells, analytical or bioanalytical processes, synthesis of molecules, macromolecules or particles, staining of particles, molecules, cells, organelles, viruses or living organisms, screening, high throughput screening, proteomics, genomics, transcriptomics, metabolomics and viability assays.

* * * * *